Patented Apr. 14, 1931

1,801,120

UNITED STATES PATENT OFFICE

HERMANN STAHEL AND FRITZ STRAUB, OF BASEL, SWITZERLAND, ASSIGNORS TO SOCIETY OF CHEMICAL INDUSTRY IN BASLE, OF BASEL, SWITZERLAND

DYESTUFFS OF THE PYRAZOLONE SERIES AND PROCESS OF MAKING SAME

No Drawing. Application filed April 5, 1929, Serial No. 352,911, and in Switzerland April 19, 1928.

The present invention relates to the manufacture of new dyestuffs. It comprises the process of making these dyestuffs, the dyestuffs themselves, and the application thereof.

According to the invention, new valuable chromium compounds of new dyestuffs of the pyrazolone series are made by coupling diazotized 2-amino-1-hydroxybenzene-4:6-disulfonic acid with an unsulfonated 1-aryl-5-pyrazolone of the general formula

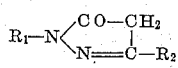

wherein $R_1$ is an unsulfonated aryl-residue and $R_2$ a $CH_3$- or $COOH$-group, and treating the azo-dyestuffs thus obtained with compounds of the trivalent chromium.

The new dyestuffs containing chromium dye the animal fibre from an acid bath orange tints of good fastness to washing and fulling and excellent fastness to light. They are further remarkable for their good solubility and their excellent equalizing properties.

The following example illustrates the invention, the parts being by weight:

26.9 parts of 2-amino-1-hydroxybenzene-4:6-disulfonic acid are dissolved or suspended in 200 parts of water and, after addition of 30 parts of hydrochloric acid and ice, the whole is diazotized as usual at 0–5° C. with 7 parts of sodium nitrite. The diazo-solution thus formed is then, while stirring, run into an ice-cold solution of 17.4 parts of 1-phenyl-3-methyl-5-pyrazolone of the formula

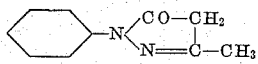

and 30 parts of sodium carbonate in 300 parts of water. After the coupling is complete the whole is heated to 60° C. and the dyestuff then salted out with common salt, filtered, pressed, and dried. It forms a yellowish red powder which dissolves in water to an orange-red solution, and in concentrated sulfuric acid to a pure yellow solution. Wool is dyed from an acid bath yellow-brown tints. By after-chroming the color turns to orange-red.

95.2 parts of the dyestuff obtained as above described are dissolved in 2000 parts of boiling water, 30.4 parts of chromium oxide in the form of a solution of chromium fluoride are added and the whole is boiled for a certain time in a reflux apparatus.

By evaporation and salting out or by evaporation and crystallization, the dyestuff is isolated. It is a yellow-brown powder soluble in water to a yellow-orange solution, in aqueous caustic soda solution to a yellow-orange solution and in concentrated sulfuric acid to a yellow solution; it dyes wool in a dye-bath acid with sulfuric acid orange tints of excellent properties of fastness.

Products which dye orange to red are further obtained when dyestuffs are made with other 1-aryl-5-pyrazolones, such as inter alia:

1-(3'-sulfamido)-phenyl-3-methyl-5-pyrazolone, 1-(3'-carboxy-4'-oxy)-phenyl-3-methyl-5-pyrazolone, and 1-(3'-carboxy-4'-oxy)-phenyl-5-pyrazolone-3-carboxylic acid.

What we claim is:—

1. In the process of making azo-dyestuffs containing chromium the step comprising coupling diazotized 2-amino-1-hydroxybenzene-4:6-disulfonic acid with the 1-phenyl-3-methyl-5-pyrazolone of the formula

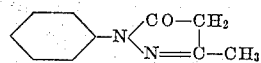

2. Process for the manufacture of azo-dyestuffs containing chromium, consisting in treating with compounds of the trivalent chromium the azo-dyestuffs made by coupling diazotized 2-amino-1-hydroxybenzene-4:6-disulfonic acid with 1-aryl-5-pyrazolones of the general formula

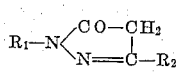

wherein $R_1$ is an unsulfonated aryl-residue and $R_2$ a $CH_3$- or $COOH$-group.

3. Process for the manufacture of azo-dyestuffs containing chromium, consisting in treating with compounds of the trivalent chromium the azo-dyestuff made by coupling diazotized 2-amino-1-hydroxybenzene-4:6- disulfonic acid with 1-phenyl-3-methyl-5-pyrazolone of the formula

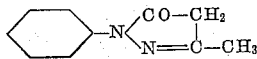

4. Process for the manufacture of azo-dyestuffs containing chromium, consisting in treating with chromic oxide in the form of a solution of chromium fluoride the azo-dyestuff made by coupling diazotized 2-amino-1-hydroxybenzene-4:6-disulfonic acid with 1-phenyl-3-methyl-5-pyrazolone of the formula

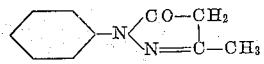

5. As new products the chromium compounds of the azo-dyestuffs from diazotized 2-amino-1-hydroxybenzene-4:6-disulfonic acid and 1-aryl-5-pyrazolones of the general formula

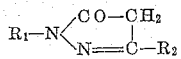

wherein $R_1$ is an unsulfonated aryl-residue and $R_2$ a $CH_3$- or $COOH$-group, which products form yellow powders which dissolve in water and dilute caustic soda solution to yellow-orange solutions, dyeing wool in a dye-bath acid with sulfuric acid very uniform and fast orange to red-orange tints.

6. As new products the cromium compounds of the azo-dyestuffs from diazotized 2-amino-1-hydroxybenzene-4:6-disulfonic acid and 1-phenyl-3-methyl-5-pyrazolone of the formula

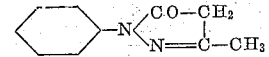

which products form yellow-brown powders which dissolve in water and dilute caustic soda solution to a yellow-orange solution and in sulfuric acid to a yellow solution, dyeing wool in a dye-bath acid with sulfuric acid very uniform orange tints of very good fastness properties.

7. The material dyed with the dyestuffs of claim 5.

8. The material dyed with the dyestuffs of claim 6.

In witness whereof we have hereunto signed our names this 25th day of March, 1929.

HERMANN STAHEL.
FRITZ STRAUB.